US007412264B2

(12) United States Patent
Swallow

(10) Patent No.: US 7,412,264 B2
(45) Date of Patent: Aug. 12, 2008

(54) LONE WORKER MONITOR

(75) Inventor: Craig Swallow, Leamington Spa (GB)

(73) Assignee: Connexion2 Limited, Sheffield (GB)

( * ) Notice: Subject to any disclaimer, the term of this patent is extended or adjusted under 35 U.S.C. 154(b) by 701 days.

(21) Appl. No.: 10/998,186

(22) Filed: Nov. 26, 2004

(65) Prior Publication Data

US 2005/0151669 A1 Jul. 14, 2005

(30) Foreign Application Priority Data

Nov. 28, 2003 (GB) ................................ 0327758.9
Apr. 6, 2004 (GB) ................................ 0407781.4

(51) Int. Cl.
*H04B 1/38* (2006.01)

(52) U.S. Cl. .................... 455/567; 455/423; 455/575.6; 455/466; 455/427; 455/566; 348/14.1; 340/539.12

(58) Field of Classification Search ................. 455/566, 455/41.2, 422.1, 423, 426.1, 445, 417, 517, 455/456–457, 404.1–404.2, 575.6, 567, 466, 455/427; 348/14.01–14.02, 14.07, 14.1; 340/5.78–5.79, 426.2, 539.32, 539.12; 379/373.01, 379/185, 252, 179, 164, 433.04, 93.23, 88, 379/88.11, 88.01; 345/2.3, 156, 3.1, 1.1
See application file for complete search history.

(56) References Cited

U.S. PATENT DOCUMENTS

| | | | | |
|---|---|---|---|---|
| 5,742,233 | A | 4/1998 | Hoffman et al. | |
| 5,793,419 | A | 8/1998 | Fraley | |
| 6,330,499 | B1 | 12/2001 | Chou et al. | |
| 7,116,972 | B1 * | 10/2006 | Zhang et al. | 455/414.1 |
| 2002/0072982 | A1 * | 6/2002 | Barton et al. | 705/26 |
| 2002/0076003 | A1 | 6/2002 | Zellner et al. | |
| 2002/0094806 | A1 * | 7/2002 | Kamimura | 455/567 |
| 2002/0183091 | A1 * | 12/2002 | Heo | 455/556 |
| 2004/0252197 | A1 * | 12/2004 | Fraley et al. | 348/207.1 |
| 2004/0259500 | A1 * | 12/2004 | Kim | 455/41.2 |
| 2006/0004834 | A1 * | 1/2006 | Pyhalammi et al. | 707/102 |

FOREIGN PATENT DOCUMENTS

| | | | |
|---|---|---|---|
| DE | 20108069 | U1 | 11/2001 |
| GB | 2260880 | A | 4/1993 |
| GB | 2306275 | A | 4/1997 |
| GB | 2348080 | A | 9/2000 |
| GB | 2384949 | A | 8/2003 |
| GB | 2386795 | A | 9/2003 |
| GB | 2388753 | A | 11/2003 |
| GB | 2392057 | A | 2/2004 |

* cited by examiner

*Primary Examiner*—William Trost
*Assistant Examiner*—Kamran Afshar
(74) *Attorney, Agent, or Firm*—Richard M. Goldberg

(57) ABSTRACT

A system has a monitor attached to and monitoring sound and vision around the user and using cellular telephone communications to convey monitored information. The monitor calls a primary server which alerts a secondary server of call receipt. The secondary server calls the monitor which drops the call to the primary server after a predetermined time, and remains in contact with the secondary server only if the monitor has successfully received the call from the secondary server, thereby preventing introduction of a false monitor. The monitor has options alterable only when on a battery charging cradle. The monitor has amber and red alert modes involving further servers, providing means to monitor and record the sounds and vision. The monitor has satellite position reporting. The system employs cell phone inter base station signal strength interpolation to find the monitor's position. A vibration motor silently alerts the user to calls.

27 Claims, 8 Drawing Sheets

LONE WORKER MONITOR

RELATED APPLICATIONS

The present application claims priority from UK patent application 0327758.9, filed 28 Nov. 2003 and from UK patent application 0407781.4, filed 6 Apr. 2004, the disclosures of which are incorporated herein by reference.

FIELD OF THE INVENTION

The present invention relates to equipment for monitoring lone workers who might find themselves in a hazardous situation.

BACKGROUND OF THE INVENTION

Many workers may find themselves in situations made hazardous by encounters with persons and the places where those encounters occur. One example of an at-risk worker is medical staff who might be required to make house calls on psychiatric patients. Another example is social work staff who might be required to visit clients where there is perceived to be a risk of violence or threat. Yet another example is a bus driver who is at possible risk from his passengers or other drivers he may encounter. There are many other examples. The present invention seeks to provide means whereby the location of the worker and events that happen to the worker can be known and shared.

Even if the events that happen to the worker may be known, it is of little use if the worker cannot be rescued. The present invention seeks to provide monitoring means whereby early intervention is made possible.

An audit trail, verifying what happened, when, and who was involved, is highly desirable but difficult to achieve with personal monitors. The present invention seeks to provide that an audit trail can readily be established.

There is always a risk that an erroneous call might be mistaken for a call from a personal monitor, or that a worker can be deliberately subjected to violence and threat and protected from being monitored by a false monitoring device being introduced in place of the monitoring device which the worker actually uses to make a false call. The present invention seeks to make it impossible to introduce a false monitoring device or to allow accidental monitoring of an erroneous call.

Cellular telephone networks can be very expensive to place traffic over. Long periods of monitoring a personal monitor can be very costly. The present invention seeks to provide that the cost of monitoring the individual can kept to a minimum.

According to one aspect, the present invention provides a monitor and first and second voice servers, the monitor placing a call for a predetermined time to the first server, said first server alerting said second server, and said second server calling said monitor within said predetermined time, said monitor abandoning said call to said first server after said predetermined period, and only being in communication with second server if said second call has been successfully received by said monitor.

The invention also provides that the lone worker monitor is communicable with one or more voice servers, said monitor being operable to place a voice call thereto, and said one or more voice servers being operative automatically to record a call.

The invention also provides that the lone worker monitor is capable of being located by interpolation of mobile telephone signal strengths by measurement of the radiation from the monitor at one or more telephone base stations.

The invention also provides a monitor which, in order to prevent false changing of settings, can only have it settings altered when in a charging cradle or connected directly to a mains charger.

The invention also provides that the settings can be changed by short message service messages.

The invention further provides that the lone worker monitor can be coupled to receive satellite positioning signals, such as, but not limited to, GPS signals, and can be operative to calculate and report the position of the lone worker monitor.

The invention further provides that the lone worker monitor can comprise a camera, that the lens of the camera can be hidden, that the camera can be operative to take one, the other or both of video images and still images, that the lone worker monitor can relay the images from the camera by short range radio link, by GSM technology, by GPRS technology, WAP technology, or by any radio, wireless, cellular ground, satellite, fibre optic or cable communications protocol available now or in the future, or any combination thereof.

The invention further provides that the lone worker monitor can be coupled to communicate with external equipment by means of a short range wireless connection, that the external equipment can be operative to pass information and signals to and from the lone worker monitor, and that the external equipment can be operative to provide some or all of the communications with the cellular telephone network.

The invention further provides that the short range wireless connection can provide passage into and/or out of the lone worker monitor of sound representative signals, and that the short range wireless connection can provide passage out of the lone worker monitor of image representative signals.

The invention further provides that the camera can be provided alone in the lone worker monitor, or that the camera can be provided in conjunction with the microphone.

The invention further provides that the camera can be operated alone in the lone worker monitor, or that the camera can be operated in conjunction with operation of the microphone, or that the microphone can be operated alone in the lone worker monitor.

The invention also provides that the lone worker monitor is communicable with one or more image servers, the lone worker monitor being operable to place an image call thereto, and said one or more image servers being operative automatically to record images from a call.

The invention further provides that image servers can be the same servers as the voice servers.

The invention further provides that the short range wireless connection can be Bluetooth™, and/or that the short range wireless connection can comprise any known or to be developed short range wireless connection means compatible with the requirements of the invention.

BRIEF DESCRIPTION OF THE DRAWINGS

These, and further features of the invention, are explained below by way of example, and are made clear in the following description, read in conjunction with the appended drawings, in which.

And

Figure 8:
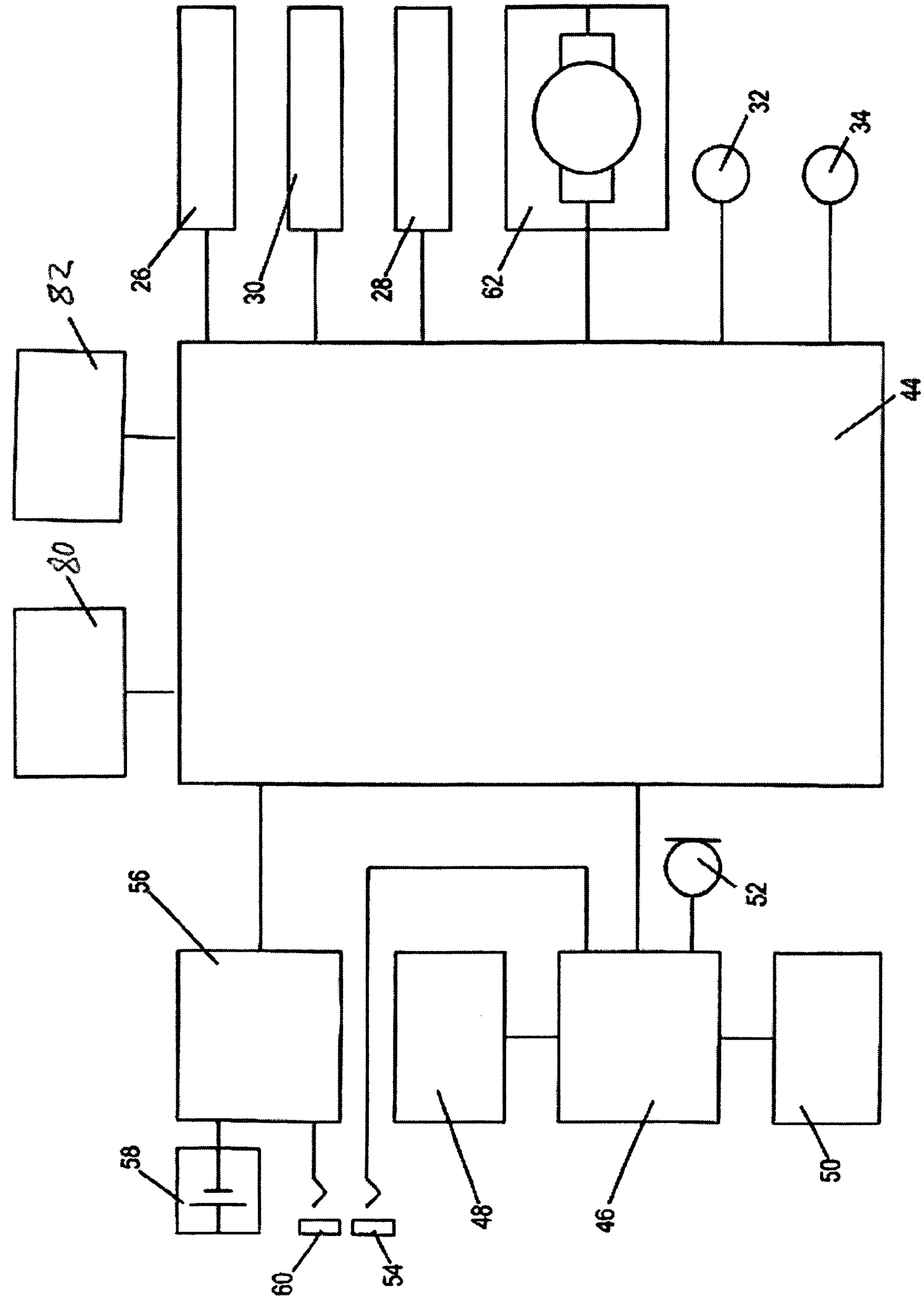
FIG. 8 is a schematic block diagram showing an example of another configuration for the lone worker monitor where a camera (and a microphone) are linked to the outside world by means in part of short range wireless communication and in part by means of a cellular telephone link.
Figure 9:
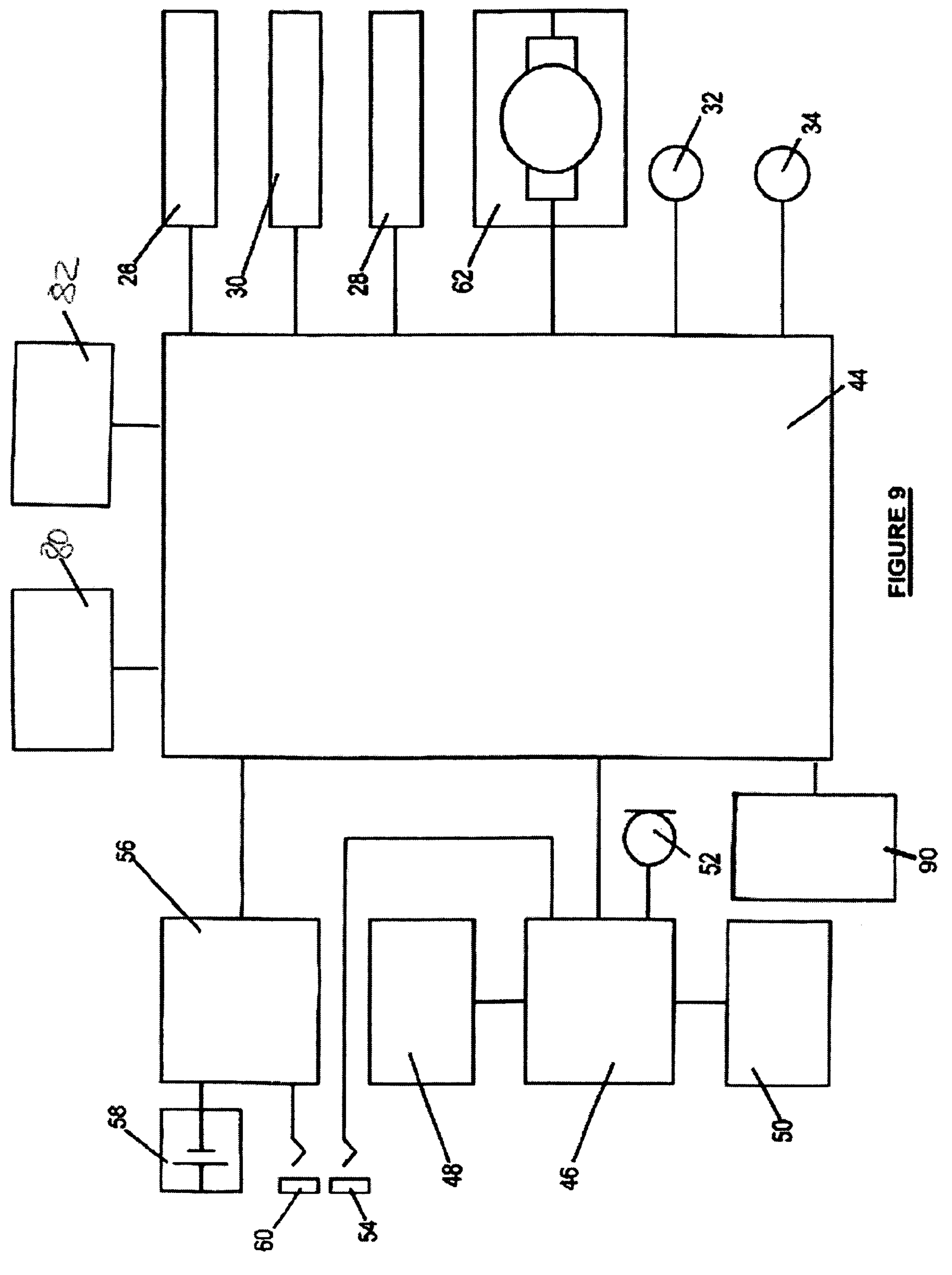

FIG. 9 is a schematic block diagram showing an example of another configuration for the lone worker monitor where the apparatus of FIG. 8 is further provided with satellite navigation position determination means.

DESCRIPTION OF PARTICULAR EMBODIMENTS

Figure 1A:
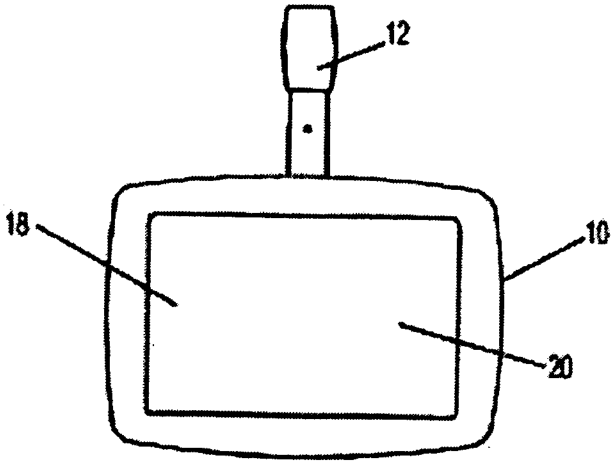
FIGS. 1A, 1B and 1C show three views of a Lone Worker Monitor and as worn by an individual.
Figure 1B:
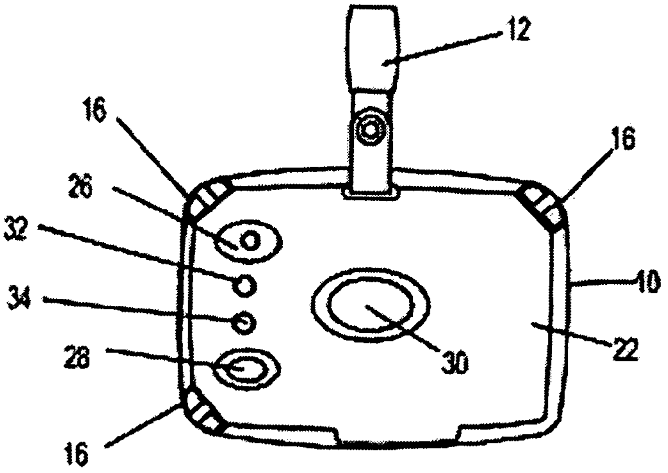
Figure 1C:
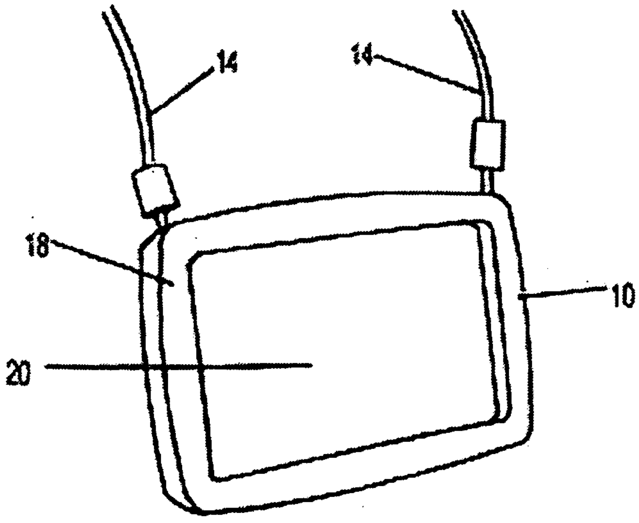

Attention is first turned to FIGS. 1A to 1C, showing three views of a lone worker monitor as used and worn.

In FIG. 1A to 1C, the lone worker monitor 10 is shown as an electronic device, having a substantially uniform thickness of about 1 cm, a length of about 10 cm, and a height of about 5 cm. These dimensions are only guidelines, and other dimensions can be applied. The lone worker monitor 10 is intended to be worn about the person, and can be provided with a clip 12 for attaching the lone worker monitor 10 inside or outside of the clothing, or a lanyard 14 which can be attached to anchor points 16 on the periphery of the rear of the lone worker monitor 10 in either the landscape configuration or the portrait configuration. The front surface 18 of the lone worker monitor 10 bears a worker identification card 20 which is slipped in from one side. The rear surface 22 of the lone worker monitor 10 possesses a recess 24 for accommodating the clip, togther with three buttons which can be activated. A display status switch 26 allows, as is explained hereafter, information about the internal state of the lone worker monitor to be conveyed to the user. An amber alert switch 28 can be used, as described hereafter, to provide signals relating to an amber alert. A red alert switch 30 can be used, as described hereafter, to provide signals relating to a red alert. In a manner explained in more detail hereafter, a three coloured (RED, GREEN and AMBER) battery LED 32 (Light Emitting Diode) and a three coloured (RED, GREEN and AMBER) GSM network status LED 34 are used to convey the internal state of the lone worker monitor 10.

Figure 2:
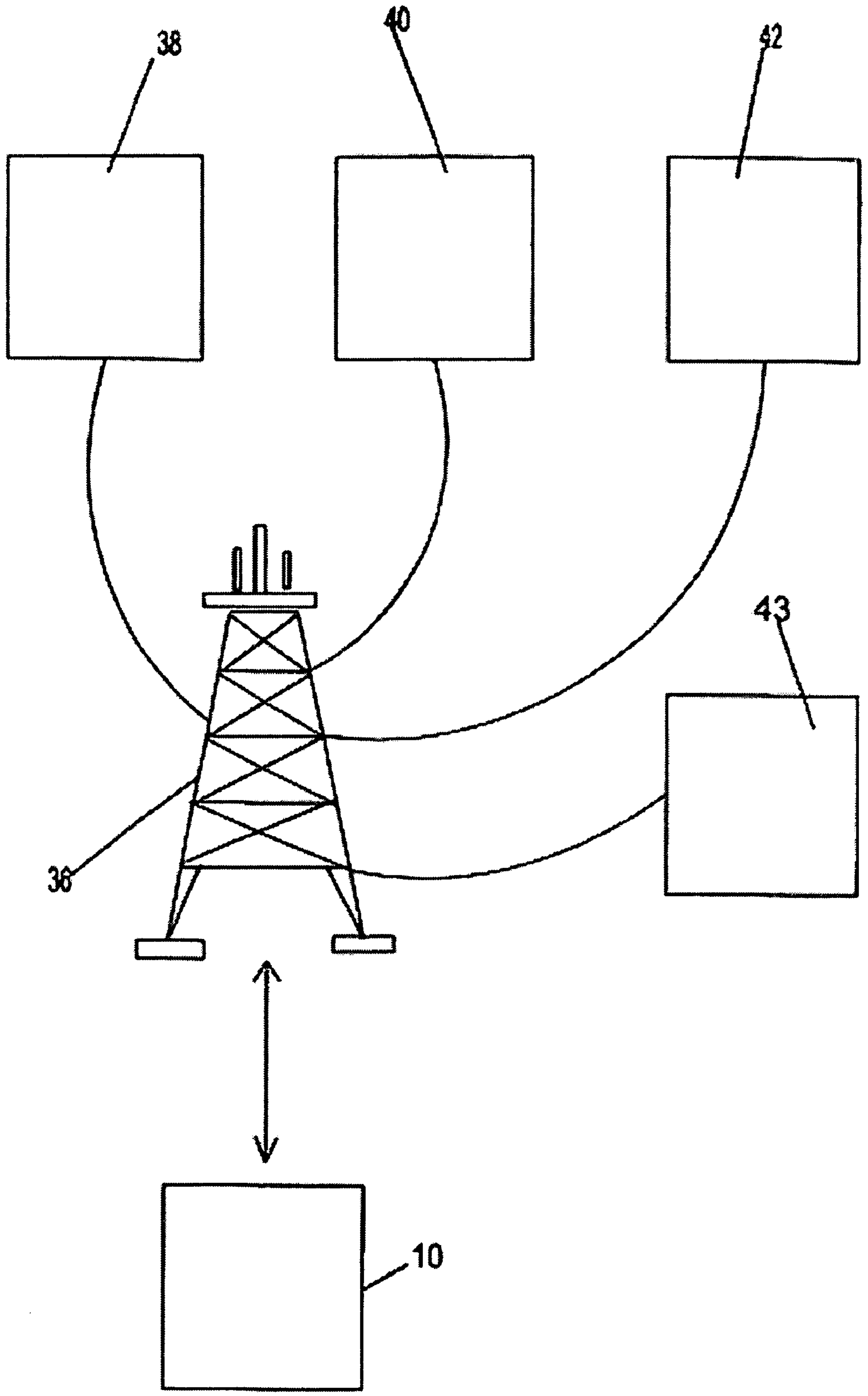
FIG. 2 shows a schematic diagram of the electronic and communications environment where the lone worker monitor is used.

Attention is next drawn to FIG. 2, which shows the electronic environment in which the lone worker monitor 10 is used.

The lone worker monitor 10 is in radio communication with elements of the terrestrial telephone network 34 in the manner of a cellular telephone and can send and receive text messages and can send voice messages. All this is described hereafter.

A first element in the terrestrial telephone network is the primary server 38 which is the initial point of contact for the lone worker monitor 10, as will be described later. A second point of contact is the secondary server 40 which, as the name suggests, is the second point of contact for the lone worker monitor 10, in a manner which is later described. A third element in the terrestrial telephone network is the voice server 42 which, as the name suggests, is involved in receiving and, optionally, recording, material audible in the vicinity of the lone worker monitor 10.

In addition to receiving and sending signals from and to elements of the terrestrial telephone network, the lone worker monitor 10 also places a radio signal between base stations which allows the position of the lone worker monitor to found by signal strength interpolation.

Figure 3:
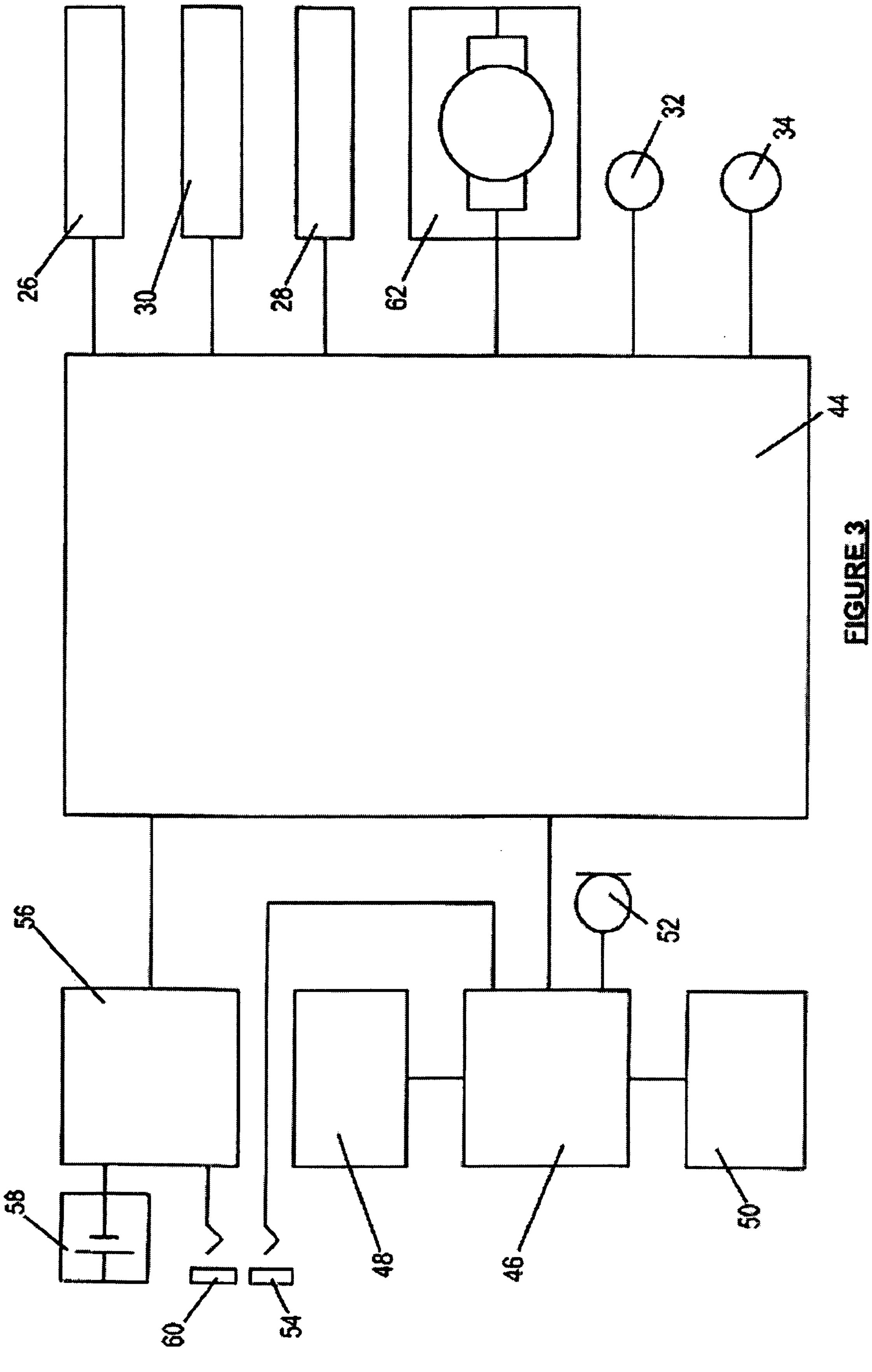
FIG. 3 is a schematic block diagram of the interior parts of the lone worker monitor.

Attention is next drawn to FIG. 3, showing a schematic block diagram of the interior parts of the lone worker monitor.

The heart of the lone worker monitor 10 is a microprocessor controller 44 which controls and monitors all of the activities of the lone worker monitor 10. A GSM modem 46 is attached to a SIM card 48, a mobile phone (GSM) aerial 50, a microphone 52 and a speaker jack 54. The modem 46, the SIM card 48, the microphone 52 and the speaker jack 54 together make up elements which would be found in the average cellular telephone.

A charge monitor and regulator 56 charge and monitor the charge on a battery 58 from a charging jack 60. The battery 58 supplies power to the entire lone worker monitor.

The display status switch 26, the red alert switch 30, the amber alert switch 28, the Battery LED 32 and the GSM LED 34 are all under control of the microprocessor controller 44. A vibration motor 62 is also controlled by the microprocessor controller 44 and serves to alert the user of the lone worker monitor 10 when certain events or epochs have taken place.

Not shown in a drawing, but implicit in the description, the lone worker monitor 10 also is associated with a docking station in the form of battery charger with a speaker so that the charging jack 60 and the speaker jack 56 can be plugged in.

The lone worker monitor 10 has various ways in which it works, all supported by the apparatus shown in the preceding figures.

Firstly, the lone worker monitor 10 has three (3) user configurable server telephone numbers which can be used by the device. As earlier stated, the primary server 38 is a first source of communications, a secondary server 40 is a second source of message communications and voice server 42 allows sound, picked up by the microphone 52, to be received and recorded. Configuration of the primary server 38 number, the secondary server 40 number and the voice server 42 number is required before the lone worker monitor 10 can operate. If any of the primary 38, secondary 40 or voice 42 server numbers remain unconfigured, then any so directed messages will not be sent, and the lone worker monitor 10 will continue to operate as if they had been sent.

The lone worker monitor 10 has five various operating modes.

A first mode is a power down or sleep mode. In the power down or sleep mode, the lone worker monitor 10 is set to low power mode. In this condition, the modem 46 is switched off and the processor 44 is put into low power sleep mode. All LEDs 32 34 are turned off. Wakeup of the lone worker monitor 10 from power down or sleep mode can be effected by depressing any switch 26 28 30 or by connecting the lone worker monitor 10 to the battery charger cradle.

Another mode is the "modem 46 off" mode. If the lone worker monitor 10 is operated out of network coverage for a predetermined time, the lone worker monitor 10 automatically switches the modem 46 off. Power to the modem 46 is restored when any button 26 28 30 is pressed on the lone worker monitor 10 to activate one of the functions.

Another mode is the low battery 58 mode. When the battery 58 level reaches a low state of charge, close to zero charge, the lone worker monitor 10 sends a message to a pre-configured telephone number and then switches to the low power mode with the modem 56 turned off. Return to normal operation will only occur if the unit is connected to the battery charger.

Another manner of operating is the "power off" mode. The lone worker monitor 10 is completely switched off by simultaneously pressing and holding the display status 26 and amber alert 28 buttons on for longer than a predetermined period of three seconds. The vibration motor 62 is then activated to signal confirmation of entry into the power off state by providing a sequence of two short 0.1 separated periods of vibrations with a 0.2 second gap there between. To switch the lone worker monitor 10 back on from the power off state, both the amber 28 and the display status 26 buttons are simultaneously pressed for a predetermined period of longer than three seconds. The lone worker monitor 10 then switches on to resume normal operation, starting with, as explained below, the Display Status state.

Another manner of operation is the charging/configuration mode. When the lone worker monitor 10 is connected to the charger, it will enter charging and configuration mode. In this mode the modem 56 is turned ON and scanned continuously for incoming SMS command messages. When in charging mode the battery LED 32 is activated. If the charger is connected but the battery 58 is not being charged the Battery LED 32 flashes red. When the battery LED is a flashing amber, it indicates that the battery 58 is charging and, when the battery LED is a constant green light, that charging is complete. Because the modem 46 is set to operate in a low power mode there is a delay between the charger being connected and the LED status updating. This can be up to 60 seconds. To start charging, the battery charger is connected and the status display switch 26 is pressed for three or more seconds. After the charger is disconnected the LED's continue to display for a further five seconds before going out.

The lone worker monitor 10 has various functions it performs when operational.

One function is configuration. The lone worker monitor 10 can only be configured when in charging mode and sitting in the charger. The lone worker monitor 10 is commanded by receiving short message service (SMS) command messages from its primary server 38. If the lone worker monitor 10 is in any other than charging mode, or is not on the charger, the lone worker monitor 10 simply ignores configuration SMS command messages and always stays in its current configuration. If all of the conditions for responding to SMS command messages are fulfilled, when an incoming SMS is detected, its contents are validated to determine if it matches any one of the command syntaxs and, if the SMS message has a valid syntax format, the SMS command message is received and obeyed. The nature of SMS command messages is given below.

Another function is to provide a display status report. When the the display status switch 26 is pressed for three seconds or more, it requests that the current status of the unit should be displayed on the LEDs 32 34. In response, the lone worker monitor 10 wakes up the modem 46 and causes both the GSM and battery status LEDs 32 34 repeatedly to flash ON for a tenth of a second and OFF for one second. The battery status LED 32 continues to flash until a valid status is provided as output from the modem 46, or for after the elapse of minute, whichever is the sooner. If the modem 46 provides no status output, or if the battery 58 state of charge is low, the battery status LED 32 will show constant red. If the battery 58 state of charge is below 70%, the battery status LED 32 will show constant amber. Otherwise the battery status LED 32 will show constant green.

Once the display status switch 26 has been pressed for three seconds or longer, the GSM status LED 34 continues to flash until a valid signal quality is detected from the GSM receiving modem 46, or for one minute, whichever is sooner. If no signal quality (SQ) signal is detected from the GSM receiving modem 46, or if the GSM signal quality is bad, the GSM status LED 34 shows constant red. If the signal quality is average, the GSM status LED 34 shows constant amber. Otherwise, the GSM status LED 34 shows constant green.

If there is no SIM card 48 fitted, or if there is a fault with the SIM card 48, the vibration motor 62 operates for three seconds and the GSM 34 and battery 32 LEDs both flash alternate red for ten seconds, once the status has been determined. Once both GSM and battery LEDs have shown their constant status for five seconds, both the battery LED 32 and the GSM LED 34 are turned off and the lone worker monitor 10 returns to sleep mode.

If status reporting is enabled, the lone worker monitor 10 also sends a message to one or other of the Primary 38 or Secondary 40 server telephone numbers, or, selectably, to both, to show the signal strength received from one or from each. At the same time, the lone worker monitor 10 reports battery level. The report is not sent if no network is available at the time of the check.

Another function for the lone worker monitor 10 is amber alert. If the amber alert button 28 is pressed for more than a predetermined period of time, the lone worker monitor 10 enters amber alert mode. When entering amber alert mode, a timer is started and the vibration motor 62 is turned on for one second. In addition, a pre-configured SMS message 'AMBER ALERT' is sent to the primary server 38. Also, a user configurable SMS message defaulted to 'AMBER ALERT' is sent to the secondary server 40. The amber alert timer defaults to thirty minutes, but is user configurable to be any value between one minute and sixty minutes. At the same time, the lone worker monitor 10 opens a voice call to an amber voice number 43. This number can be configured by the user. The GSM 34 and battery 32 LEDs light red while the call is being connected and turn to amber once the connection has been made. Once connected, the voice call is held open for a user defined period of between one second and sixty seconds. During the period of the voice call, the lone worker monitor listens for an incoming call. If an incoming voice call is received, the voice call it is picked up and made permanent and the outgoing call will be dropped. This puts termination of the call under the control of the incoming caller. Once the call is terminated the GSM 34 and battery 32 LEDs go out.

In amber alert function, the lone worker monitor 10 attempts to dial the amber alert server 43 before sending any text messages. If the voice call from the lone worker monitor 10 cannot connect, the lone worker monitor 10 then tries to send the text message, before attempting a resend of the voice message. Calls and messages will continue to be tried for a set number of times, defined by the configuration commands for each number.

At the end of the amber alert time period the vibration motor 62 is turned on for two seconds to remind the user to either cancel the alert or extend the amber alert period.

At the end of this period the user can do one of three things:—

1. If the user does not do anything, the lone worker monitor 10 enters red alert mode after 1 minute.

2. If the user presses the amber alert switch 28 again for less than three seconds, the amber alert timer is extended by a second time period and the vibration motor 62 is turned on for half a second. This secondary time extension defaults to ten minutes and is user configurable for any period between one minute to sixty minutes. The end of these additional extension periods is signalled in the same way as end of the amber alert period, and more extension periods can be added each time the previous additional time period ends.

3. If the user presses the amber alert switch 28 for more than three seconds the amber alert mode is cleared. The vibration motor 62 signals confirmation of the termination by two short one tenth of a second periods of vibration with a two tenth second gap there between. In addition a pre-configured SMS message 'AMBER ALERT CLEARED' is sent to the primary server 38. Also, a user configurable SMS message defaulted to 'AMBER ALERT CLEARED' is sent to the secondary server 40. The content of this message can be set, as is explained below.

If during the amber alert timed period the amber alert button is pressed, one of two things happens:

1. If the user presses the amber alert button 28 for less than 3 seconds, any remaining time for the current period is cancelled and the amber alert period restarts using the extension period. The vibration motor 62 is turned on for half a second.

2. If the user presses the amber alert button 28 for more than 3 seconds, the amber alert mode is cleared. The vibration motor 62 signals confirmation of the termination by two short one tenth second periods of vibration with a two tenth second gap there between. In addition, a pre-configured SMS message 'AMBER ALERT CLEARED' is sent to the primary server 38. Also, a user configurable SMS message defaulted to 'AMBER ALERT CLEARED' is sent to the secondary server 40.

Pressing the display status button shows an amber light on the GSM LED 34 if the amber alert is in progress.

Another function of the lone worker monitor 10 is red alert. If the red alert switch 30 is pressed for more than a predetermined period of time, the lone worker 10 monitor enters red alert mode. When entering red alert mode the vibration motor 62 gives three periods of vibration, each one tenth second long, in succession. A voice call is initiated to be received by the voice server telephone 42 number and the microphone 52 is enabled so that the voice server 42 can listen to or record the situation. In addition, a pre-configured SMS message 'RED ALERT' is sent to the primary server 38. Also, a user configurable SMS message defaulted to 'RED ALERT' is sent the secondary server 40.

When the voice call has been established, the lone worker monitor 10 remains in red alert mode with the voice link open for a user defined period of between one second and sixty seconds. During this time, the lone worker monitor 10 accepts and answers an incoming call allowing the server to continue the call after the 30 second time out.

In red alert, the lone worker monitor 10 attempts to dial the voice server 42 before sending any text messages. If the voice call cannot connect, the lone worker monitor 10 then tries to send the text message, before attempting a resend of the voice message. Calls and messages will continue to be tried for a set number of times, defined by the configuration commands for each number.

If the user presses the red alert switch 30 for more than three seconds, the red alert mode is cleared. The vibration motor 62 signals confirmation of the termination by two short one tenth second periods of vibration with a half second gap there between. In addition, a pre-configured SMS message 'RED ALERT CLEARED' is sent to the primary server 38 and the voice link is terminated. Also, a user configurable SMS message defaulted to 'RED ALERT CLEARED' is sent to the secondary server 40.

Pressing the display status button 26 shows a red light on the GSM status indicator if the red alert mode is set.

Another function is "Chain Red Alert". If the chain feature is enabled on the lone worker monitor, the unit can send a red alert message if the chain switch is activated. The "Chain Red Alert" will operate in power down and amber alert modes.

If the chain is detached for more than 1 second and the chain feature is enabled, the chain feature is activated and the unit enters red alert mode. When entering 'red alert' mode, the vibration motor 62 gives three one tenth second bursts in succession. In addition a pre-configured SMS message 'RED ALERT' is sent to the primary server 38. Also, a user configurable SMS message defaulted to 'RED ALERT' is sent the secondary server 40. Once the SMS messages have been sent, a voice call is initiated by the lone worker monitor to the voice server 42 telephone number and the microphone 52 is enabled so that the voice server 42 can listen to or record the situation.

Pressing the display status button 26 clears the outgoing call and show a red light on the status indicator.

Commands are sent to the lone worker monitor 10 by means of a short message service (SMS) message. The commands all start and terminate with a full stop (.). Several commands can be concatenated within one SMS message, the termination character from one command acting as a separate between commands. For example, the SMS string ".Command1.Command2.Command3." provides three commands to the lone worker monitor 10 in a single message.

If there is an error in a command, the command with the error will be ignored, but other commands in the message in the same SMS string will still be actioned by the lone worker monitor 10.

Later received commands overwrite earlier commands in the lone worker monitor. The following commands are used to configure the unit. The SIM card 48 in the lone worker monitor is used to store any changes made to the default configuration of the lone worker monitor. Changing the SIM card 48 in the lone worker monitor 10 will reset any configuration changes.

The lone worker monitor 10 is provided with Caller Location Identity (CLI) which allows the lone worker monitor 10 to send a message whose origin can be uniquely identified by the server 38, 34, 42.

There are various commands which can be sent to or from the lone worker monitor 10.

A first command message is the "Set Primary Telephone Number for SMS messages" command, and is identified by the SMS code ".SPN". The SPN command takes the form ".SPN<retry>,<number>." where <number> is the telephone number of the primary server and <retry> is the number of retries (0 to 9) made if the message is not sent. If the primary server number is set to the hash symbol, #, the primary server number is disabled.

The "Set Primary Telephone Number for SMS messages" command SMS message sets or changes the primary server 38 telephone number for receiving text messages. The primary server 38 telephone number can be either in local or international format and must be less than 18 digits long. The number is checked for valid digits but cannot be checked as a valid telephone number by the lone worker monitor. If an invalid number is set the lone worker monitor will not send a message. If the message is not sent successfully the lone worker monitor will retry the transmission.

Another command SMS message is the "telephone number of the secondary server" command, which is identified by the SMS code "SSN" and has the format .SSN<retry>, <xxxxxxxxxxxxxxxxx>. where xxxxxxxxxxxxxxxxxxxx is the telephone number of the secondary server and <retry> is the number of retries (0 to 9) made if the message is not sent. If the number if retries is set to the hash symbol, #, the telephone number of the secondary server 40 is disabled. The "SSN" command SMS message has the function of setting the secondary server 40 telephone number for SMS messages and can set or change the secondary server 40 telephone number for text messages. The phone number can be either in local or international format and must be less than 16 digits long. The secondary server 40 telephone number is checked for valid digits but cannot be checked as a valid telephone number by the lone worker monitor. If an invalid number is set the lone worker monitor 10 will not send a message. If the message is not sent successfully the lone worker monitor 10 will retry the transmission.

Another SMS command is the "Set Voice Server" command, which is designated by "SVN" and has the format ".SVN<retry>,<number>." where <number> is the telephone number of the voice server 42 and <retry> is the number of retries (0 to 9) made if the message is not sent. If the number of retries is set to the hash symbol "# ", the voice server 42 telephone number is disabled. The "SVN" command has the function of setting the telephone number of the voice server 42 and can be used to set or change the voice server telephone 42 number. The phone number can be either in local or international format and must be less than 16 digits long. The voice server telephone number is checked for valid digits but cannot be checked as a valid telephone number by the lone worker monitor 10. If an invalid voice server telephone number is set the lone worker monitor 10 will not send a message. If the message is not sent successfully the lone worker monitor will retry the call.

Another SMS command message is the "Set Amber Server Number" command which is designated "SAN" and has the format ".SAN<retry>,<number>." where <number> is the telephone number of the amber server 43 and <retry> is the number of retries (0 to 9) made if the message is not sent. If the number of retries is set to the hash symbol, #, the amber server 43 telephone number is disabled. The "SAN" SMS command has the function of set amber server and is used to set or change the amber server 43 telephone number. The amber server 43 telephone number can be either in local or international format and must be less than 16 digits long. The amber server 43 telephone number is checked for valid digits but cannot be checked as a valid telephone number by the lone worker monitor 10. If an invalid number is set the lone worker monitor 10 will not send a message. If the message is not sent successfully the lone worker monitor 10 will retry the call.

Another SMS command is the "Set Call Time" command, designated by "SCT" and having the format ".SCT<time>." where <time> is the duration for an outgoing call in seconds. In this example, the duration of a call time is in the range of 1 second to 60 seconds, though other values could be used. The SCT command has the funcion of seting or changing the duration of an outgoing call made from the lone worker monitor. When a red or amber alert voice call is made the line is held open for the selected period to allow recording or an incoming call to be established.

Another SMS command is the "Amber Alert" command, designated by "AA" and having the format ".AA<text>." where <text> is the text associated with the secondary server 40 when in an amber alert condition. The amber alert text message must be only ASCII characters and between 1 and 130 characters long. The amber alert text message must start with .AA and this is sent along with the user text when an amber alert occurs. The AA command cannot be concatenated with any other commands.

The AA command has the function of changing the text message sent to the secondary server 40 when in amber alert.

Another SMS command is the "Red Alert" command, designated by ".RA" and having the format ".RA<text>." where <text> is the text associated with the secondary server when in red alert condition. The red alert text must be only ASCII characters and between 1 and 130 characters long. The red alert text message must start with .RA and is sent along with the user text when an amber alert occurs. The RA command cannot be concatenated with any other commands. The RA command has the function of changing the text message sent to the secondary server 40 when in red alert. Another SMS command is the "Amber Cancel" command, designated by ".AC" and having the format ".AC<text>" where <text> is the text associated with the secondary server when cancelling an amber alert. The amber cancel text message must be only ASCII characters and between 1 and 130 characters long. The amber cancel text message must start with AC and this is sent along with the user text when cancelling of an amber alert occurs. The AC command cannot be concatenated with any other commands. The AC command has the function of changing the text message sent to the secondary server 40 when in amber alert is cancelled.

Another SMS command is the "Red Cancel" command, designated by ".RC" and having the format ".RC<text>" where <text> is the text message associated with the secondary server when cancelling a red alert. The red alert cancelling text message must be only ASCII characters and between 1 and 130 characters long. The red alert text cancelling text message must start with .RC and is sent along with the user text when cancelling an amber alert occurs. The RC command cannot be concatenated with any other commands. The RC command changes the text message sent to the secondary server when a red alert is cancelled.

Another SMS comand is the "Low Battery Alert", is designated by ".BA", and has the format ".BA<text>" where <text> is the text associated with the secondary server 40 when sending a low battery alert, which must be only in ASCII characters and between 1 and 130 characters long. The low battery alert text message must start with .BA and which is sent along with the low battery alert text when a low battery alert occurs. The BA command cannot be concatenated with any other commands. The BA command has the function of changing the text message sent to the secondary server by the lone worker monitor 10 when a low battery alert message is sent.

Another SMS command is the "Call Amber Time" command, designated by ".CAT" and having the format ".CAT<time>." where <time> is the time in minutes that the amber alert condition will be active. In this example, a period between 1 minute and 60 minutes can be chosen, though other periods could equally well be selected. The CAT command has the function of changing the time that the amber alert condition will be active.

Another SMS command is the "Call Red Time" command, designated by ".CRT" and having the format ".CRT<time>." where <time> is the time in minutes that the red alert condition will be active. In this example, a period between 1 minute and 60 minutes can be chosen, though other periods could equally well be selected.

The CRT command has the function of changing the time that the red alert condition will be active.

Another SMS command is the "Enable Chain Switch" command, designated by "CME" and having the simple format ".CME.". The CME command has the function of enabling the chain switch to be used to send a Red Alert message if activated.

Another SMS command is the "Disable Chain Switch" command, designated by "CMD" and having the the simple format ".CMD.". The CMD command has the function of disabling the chain switch from being used to send a Red Alert message if activated.

Another SMS command is the "Send Report" command, designated by "SRE:", and having the format ".SRE.<report>." indicating to which of the two servers a report message is set to be sent when the display status button 26 is pressed. The report destinations are designated by:

<report>=0 Send no report

<report>=1 Send report to primary server 38.

<report>=2 Send report to secondary server 40.

<report>=3 Send report to both primary and secondary servers 38 40.

The SRE command has the function of setting to which recipient, when the lone worker monitor 10 and the recipient enter status reporting mode, a report message is to be sent. The status message has the format ".Signal xx Battery xx." and reports the signal strength received and the state of the battery supply in the lone worker monitor 10.

Anoher SMS command is the "Download Current Configuration" command, designated by ".DCC." and having the simple format ".DCC." The DCC command will send an SMS message containing the server telephone numbers for the pimary server, the secondary server, the voice server, and the amber server, and also containing unit configuration parameters for the "Call Amber Time" CAT and "Call Red Time" CRT as defined above. A typical DCC command response, has the format Pnn,<primary server number>: Snn,<secondary server number>: Vnn,<voice server number>: Ann,<amber server number>, AT<time>, RT<time>, CT<time>, VERSION:

where VERSION is the name given to the particular current configuration.

The voice server 42 and the amber voice server 43 both have the property of not only allowing audible sounds in the vicinity of the lone worker monitor 10 to be overheard, but also to be recorded for use as assistance or evidence. By the lone worker monitor 10 placing a first call to the primary server 38, and then dropping the first call on receipt of a second call, placed to the lone worker monitor 10 by the secondary server 40 by way of confirmation of identity, the lone worker monitor 10 and its infrastructure provides an audit trail that prevents false monitors being introduced to screen the true lone worker monitor from electronic view.

Figure 4:
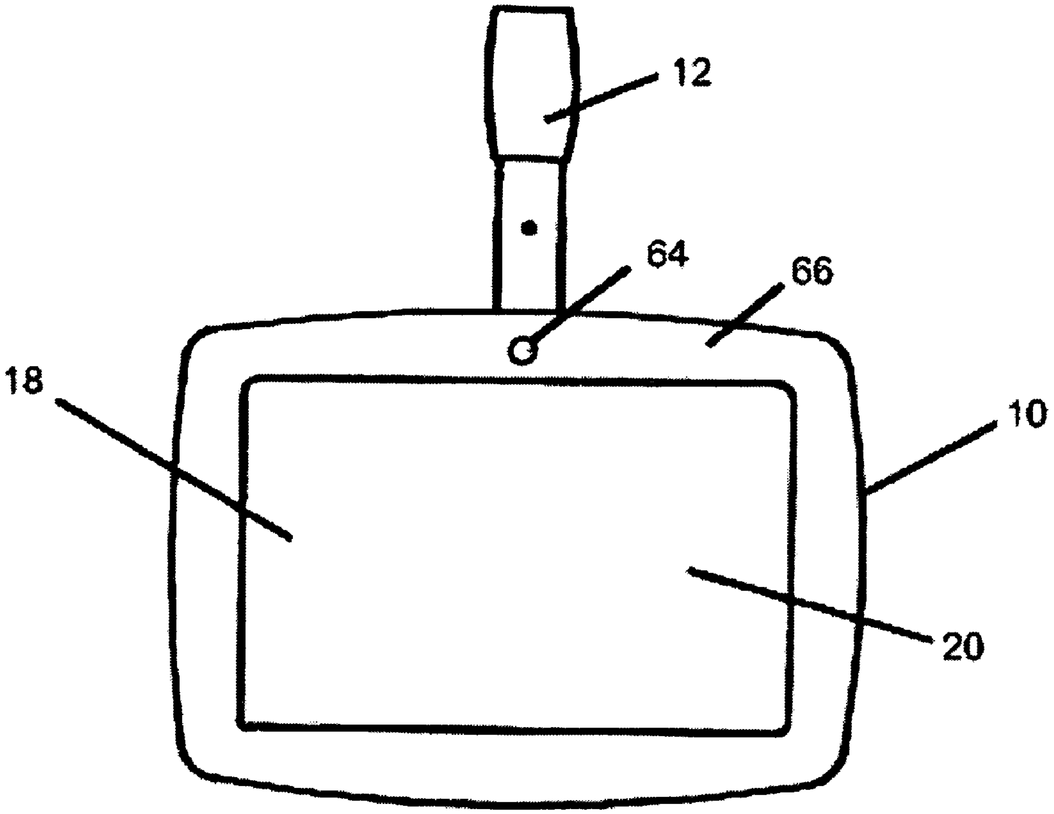
FIG. 4 is a view, from the front, showing one way in which a camera can be employed by the lone worker monitor.

Attention is next drawn to FIG. 4, showing an enlarged view of the lone worker monitor of FIG. 1A, with the addition of a camera port 64 set into the frame 66 surrounding the front surface 18 of the lone worker monitor 10. The camera port 64 is in the form of a lens or hole through which a miniature digital camera (otherwise shown in FIGS. 6, 7, 8 and 9) can take pictures of its immediate surroundings. The camera is operable to take still photographs, or to take video images. As an alternative arrangement (not shown) the camera port 64 is placed behind the worker identification card 20, which is provided with a hole so that the camera can see out from the lone worker monitor 10. For preference, the camera port 64 is substantially invisible to the casual observer, though embodiments where the camera port is clearly visible are also encompassed by the present invention.

Figure 5:
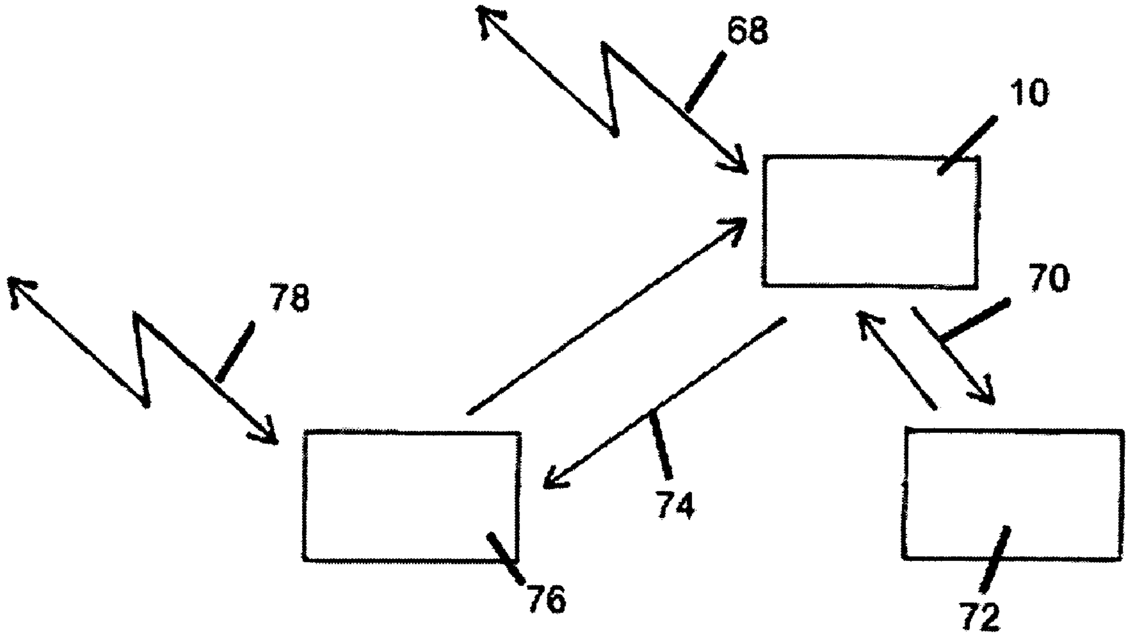
FIG. 5 is a schematic block diagram illustrating different means of external connection of the lone worker monitor.

Attention is next drawn to FIG. 5, showing a schematic block diagram illustrating different means of external connection of the lone worker monitor 10.

The lone worker monitor 10 is provided, primarily, with connection through primary cellular telephone radio link 68 which provides communication through, for example, the terrestrial telephone network 36. The lone worker monitor 10 can also be provided with a first short range wireless connection 70 to first external equipment 72. The first external equipment 72 can comprise a recorder and/or a command unit, held within, for example, a users pocket whereby the lone worker monitor 10 can be discreetly commanded by a user to perform certain actions. In particular, the display status switch 26, the amber alert switch 28 and the red alert switch 30 can be duplicated on or moved to the first external equipment 72 for discreet operation. Other alarm devices and on/off functions can be incorporated into the first external equipment 72.

The lone worker monitor 10 can also be provided with a second short range wireless connection 74 to second external equipment 76. The second short range wireless connection 74 can be the same connection as the first short range wireless connection 70, with the first external equipment 72 and the second external equipment 76 simply having different addresses. In the example shown, the second external equipment 76 is provided with a secondary cellular telephone radio link 78 which also provides cellular telephone connection with the terrestrial telephone network 36.

The second external equipment 76 can provide the sole cellular telephone communication for the lone worker monitor 10 through the secondary cellular telephone radio link 78, in which case the lone worker monitor 10 is not provided with the GSM modem 46, SIM card 48 or GSM aerial 50. The second external equipment 76 can be, for example, a mobile phone, independently usable as a mobile phone by the user, which provides a low cost option for the lone worker monitor 10 by eliminating the need for independent cellular telephone communications in the lone worker monitor 10.

As a another embodiment, the second external equipment 76 may send some of the data from the lone worker monitor 10 and the lone worker monitor 10 can send the rest. For example, the secondary external equipment 76 may be a cellular telephone capable of sending still or moving images captured through the camera port 64, and can be so employed, whereas the lone worker monitor 10 itself can provide cellular telephone communications for the main activities of the lone worker monitor 10 as described above, and also provides cellular radio communication for voice monitoring.

The primary cellular telephone radio link 68 and the secondary cellular telephone radio link 78 can be of any suitable configuration, capable of supporting the lone worker monitor 10. The primary cellular telephone radio link 68 and the secondary cellular telephone radio link 78 can comprise GSM technology, GPRS technology, WAP technology, or by any radio, wireless, cellular ground, satellite, fibre optic or cable communications protocol available now or in the future, or any combination thereof.

In another embodiment, the first external equipment 72 and the second external equipment 76 are one and the same, being incorporated together. In general terms, the first external equipment 72 and the second external equipment 76 can be so combined, and some or all of the functions and features previously described retained in the combination. Of course, the embodiment of FIG. 3, with no short range wireless connections 70, 74 and no external equipment 72, 76, the lone worker monitor 10 being a stand alone voice monitoring facility, is also a possible embodiment within the present invention.

Figure 6:
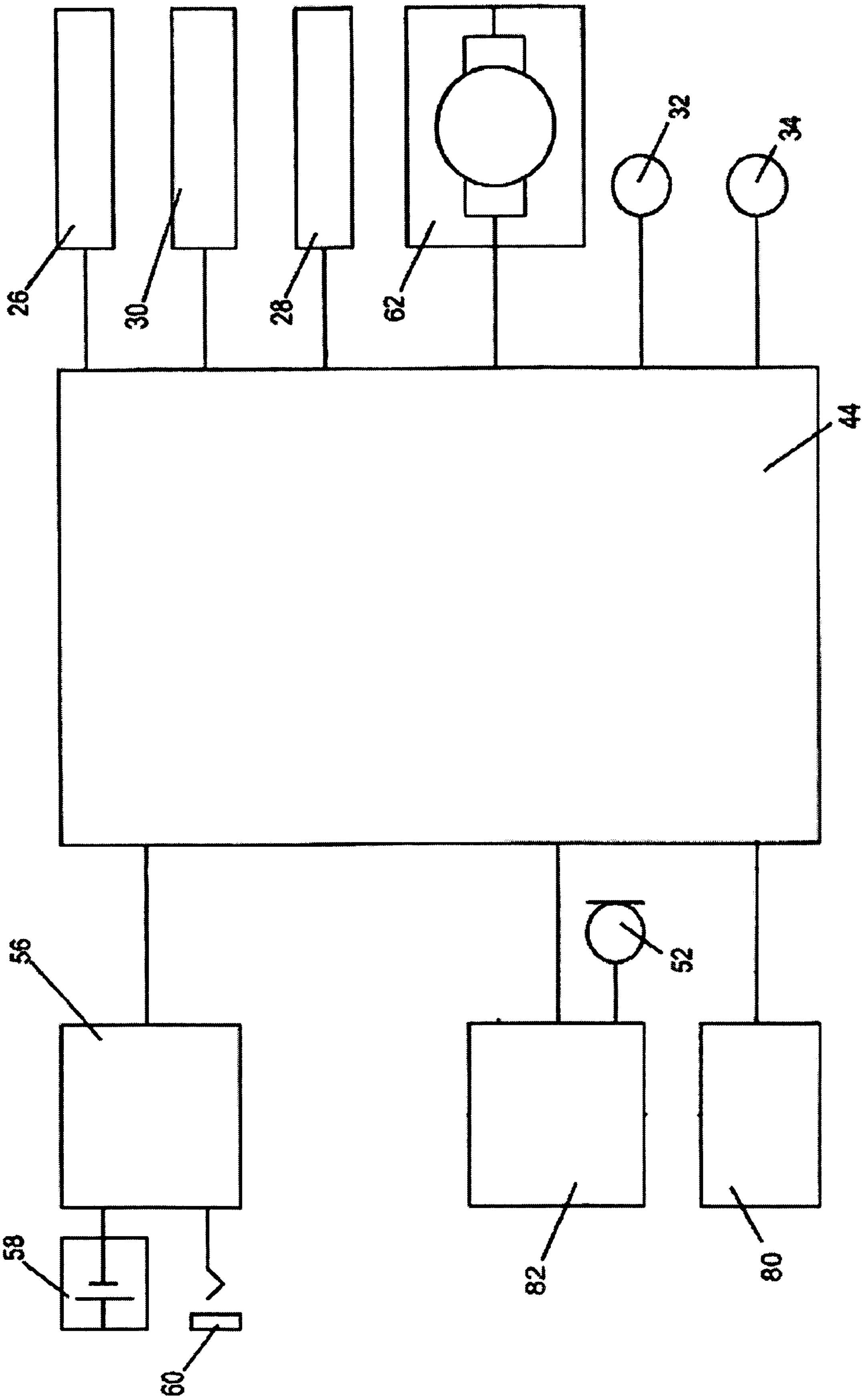
FIG. 6 is a schematic block diagram showing an example of another configuration for the lone worker monitor where a camera (and a microphone) are linked to the outside world by means of a short range wireless connection, and no other means.

Attention is next drawn to FIG. 6, showing an example of another configuration for the lone worker monitor 10 linked to the outside world by means of a short range wireless transceiver 82, and no other means. FIG. 6 shows a camera 80, linked to the controller microprocessor 44, and viewing the immediate environment through the camera port 64. The controller microprocessor 44 couples images from the camera 80 for transmission through the short range wireless transceiver 82. It is an alternative embodiment that, in FIG. 6, the camera 80 can also be omitted, leaving a solely short range wireless connection 70 74 coupled lone worker monitor 10 which is so coupled to external equipment and acts as a voice monitor alone.

Compared with FIG. 3, FIG. 6 shows the GSM modem 46, the SIM card 48 and the GSM aerial 50 have all been omitted, and the lone worker monitor 10 relies upon the short range wireless transceiver 82 to communicate with at least second external equipment 76 which provides cellular telephone connection through the secondary cellular telephone radio link 78 for both the images from the camera 80 and sounds, picked up from the microphone 52 which is used to drive part of the output from the short range wireless transceiver 82.

The short range wireless connection(s) 70,74 can be Bluetooth™, Celeron™, or any other short range wireless connection comprising any known or to be developed short range wireless connection and data transfer means compatible with the requirements of the invention. The short range wireless connections 70,74 can both, or individually, be any one from a selection of radiative field coupled, capacitively coupled, or inductively coupled, or any combination thereof. The short range wireless connections 70,74 can be increased in range such that the external equipment 72,76 can be placed at a considerable distance from the lone worker monitor 10, for example, in a parked nearby vehicle, useful for second external equipment 76 employed to provide the secondary cellular telephone radio link 78 (when used).

Figure 7:
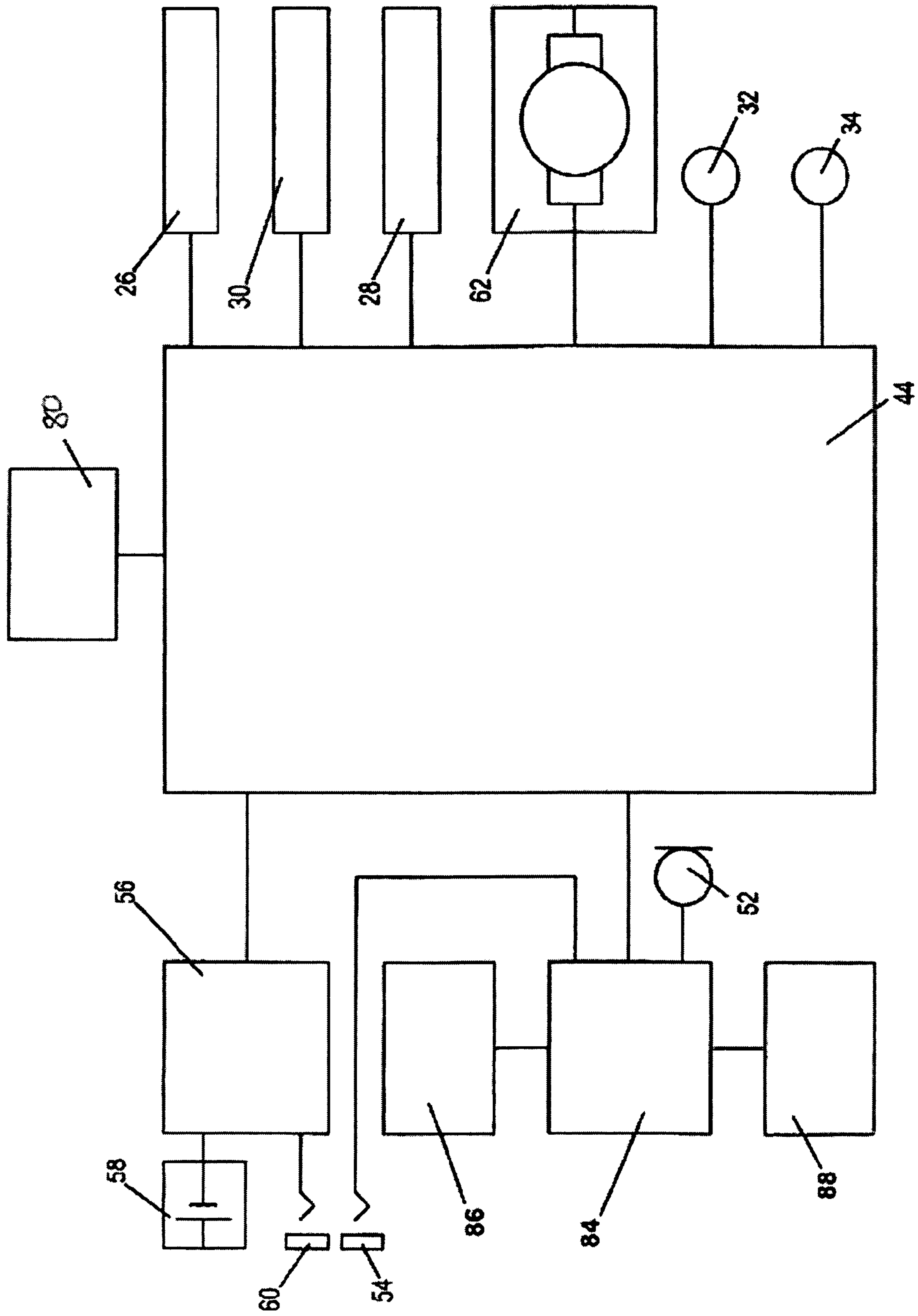
FIG. 7 is a schematic block diagram showing an example of another configuration for the lone worker monitor where a camera (and a microphone) are linked to the outside world by means of a cellular telephone link.

Attention is next drawn to FIG. 7, showing a schematic block diagram giving an example of another configuration for the lone worker monitor 10 where the camera 80 and microphone 52 are linked to the outside world by means of the primary cellular radio telephone link 68.

In FIG. 7, everything is as shown in FIG. 3, with the addition of the camera 10, as earlier described, providing still image input and/or video input to te controller microprocessor 44, which is coupled to an image enabled modem 84 to be sent via an image enabled aerial 88 coupled to co-operate with and obtain identity from an image enabled SIM card 86. The image enabled modem 84 corresponds to the GSM modem 46 of FIG. 3, the image enabled aerial 88 corresponds to the GSM aerial 50 of FIG. 3, and the image enabled SIM card 86 corresponds to the GSM SIM card 58 of FIG. 3, the difference being that different protocols and, perhaps, frequencies are used. The images are, for preference, compressed by the controller microprocessor 44 to conform to a JPEG of MPEG format, to reduce the amount of data requiring to be sent to transfer an image or video.

Attention is next drawn to FIG. 8, a schematic block diagram showing an example of another configuration for the lone worker monitor 10 where the camera 80 and microphone 52 are linked to the outside world by means in part of short range wireless communication 82 70 74 and in part by means of a the primary cellular telephone radio link 68.

FIG. 8 shows the apparatus of FIG. 3, with the addition of a camera 80 providing input to the controller microprocessor 44, and a short range wireless transceiver 84, operative to couple the images received from the camera 80 to the second external equipment 76 to be provided to the cellular radio system, and thence to the terrestrial radio network 63, by the secondary cellular telephone radio link 78.

Finally, attention is drawn to FIG. 9, showing an example of another configuration for the lone worker monitor 10 where the apparatus of FIG. 8 is further provided with satellite navigation position determination means 90, operative to receive satellite navigation signals, and either operative to decode the signals and determine the position of the lone worker monitor 10, or to pass the signals to the controller microprocessor 44 for the controller microprocessor 44 to decode the signals and determine the position of the lone worker monitor 10. In either event, the position of the lone worker monitor 10 is found and relayed to the outside world, by data or text message, through either the on-board cellular telephone communications facility 46 48 50 or via the second cellular telephone radio link 78. In this manner, the position of the lone worker monitor 10 can be determined by outside monitoring services, such as those already described.

The satellite navigation signals can be from any suitable source. GPS signals can be used, enhanced or assisted GPS signals can be used, or the proposed European Community satellite navigation facility can be used, to name but a few possibilities, now and in the future.

It is to be appreciated that the satellite navigation position determination means 90 can also be applied to the embodiments shown in FIGS. 8, 7, 6 and 3.

In all embodiments showing the camera 80, the microphone 52 can be omitted, rendering the lone worker monitor a silent image monitor.

The servers 38, 40, 42, 43 can be joined by image servers, or can be image servers as well as voice and text message servers, in the embodiments shown in FIGS. 4 to 9.

Although the lone worker monitor 10 has been shown, in FIGS. 1A to 1C and in FIG. 4 in the form of a worker identification tag, suitable for holding and appearing only to function to hold a worker identification card 20, it is to be appreciated that the lone worker monitor 10 can be provided in many different forms, suitable for inconspicuous use by individuals who would not normally display a worker identification card, and can be provided, to quote but a few of the many examples which will readily spring to the mind of the skilled person, as a badge, within clothing, as a handbag (purse), as a briefcase, as a lunch box, as a notebook, as a mobile telephone, and as a personal digital organiser.

The invention claimed is:

1. A system for monitoring the environment of an individual comprising a monitor, operative to monitor at least one perceivable aspect of a user's environment and to convey signals representative of said at least one perceivable aspect by mobile telephonic communication; a first server for receiving a call from said monitor; and a second server for placing a call to the monitor; said monitor placing a first call for a predetermined time to said first server; said first server alerting said second server that said first server has received said first call; said second server responding to said alert by placing a second call to said monitor within said predetermined time; said monitor abandoning said first call to said first server after said predetermined time, and said monitor only remaining in communication with said second server when said second call has been successfully received by said monitor.

2. A system, according to claim 1, wherein at least one of said first server and said second server is operative automatically to record said at least one perceivable aspect of a user's environment.

3. A system, according to claim 1, wherein said at least one perceivable aspect of the user's environment comprises at least one of: sound; images as a succession of periodical still images; images in video form; and a position of the user derived from a Global Positioning by Satellite (GPS) receiver.

4. A system, according to claim 2, wherein said at least one perceivable aspect of the user's environment comprises at least one of: sound; images as a succession of periodical still images; images in video form; and the position of the user derived from a Global Positioning by Satellite (GPS) receiver.

5. A system, according to claim 1, also comprising position interpolation means for estimating a position of the monitor by measuring mobile telephone signal strength at at least one mobile telephone base station.

6. A system, according to claim 2, also comprising position interpolation means for estimating a position of the monitor by measuring mobile telephone signal strength at at least one mobile telephone base station.

7. A system, according to claim 3, also comprising position interpolation means for estimating a position of the monitor by measuring mobile telephone signal strength at at least one mobile telephone base station.

8. A system, according to claim 1, wherein said monitor comprises means for receiving, holding and obeying a set comprising a plurality of operational settings, at least some of said plurality of operational settings each having at least one selectable parameter; said monitor also comprising a rechargeable battery; said system comprising a charging cradle for receiving said monitor and for charging said rechargeable battery; said monitor comprising detection means operative to detect when said monitor is in said charging cradle; and said monitor, in order to prevent false changing of the operational settings, only responding to setting change commands when said detection means detects that said monitor is in said charging cradle.

9. A system, according to claim 2, wherein said monitor comprises means for receiving, holding and obeying a set comprising a plurality of operational settings, at least some of said plurality of operational settings each having at least one selectable parameter; said monitor also comprising a rechargeable battery; said system comprising a charging cradle for receiving said monitor and for charging said rechargeable battery; said monitor comprising detection means for detecting when said monitor is in said charging cradle; and said monitor, in order to prevent false changing of the operational settings, only responding to setting change commands when said detection means detects that said monitor is in said charging cradle.

10. A system, according to claim 3, wherein said monitor comprises means for receiving, holding and obeying a set comprising a plurality of operational settings, at least some of said plurality of operational settings each having at least one selectable parameter; said monitor also comprising a rechargeable battery; said system comprising a charging cradle for receiving said monitor and for charging said rechargeable battery; said monitor comprising detection means operative to detect when said monitor is in said charging cradle; and said monitor, in order to prevent false changing of the operational settings, only responding to setting change commands when said detection means detects that said monitor is in said charging cradle.

11. A system, according to claim 8, wherein said setting change commands are provided to said monitor as mobile telephone short message service messages.

12. A system, according to claim 9, wherein said setting change commands are provided to said monitor as mobile telephone short message service messages.

13. A system, according to claim 10, wherein said setting change commands are provided to said monitor as mobile telephone short message service messages.

14. A system, according to claim 1, wherein said monitor comprises monitoring means and communication means, said communication means being separate from said monitoring means, and said monitoring means and said communication means being coupled by a short range wireless link.

15. A system, according to claim 12, wherein said short range wireless link is a Bluetooth (TM) Link.

16. A system, according to claim 1, wherein said mobile telephonic communication comprises at least one of: GSM communication; GPRS communication; WAP communication; cellular ground communication; satellite communication; fibre optic communication and cable communication.

17. A system, according to claim 2, wherein said mobile telephonic communication comprises at least one of: GSM communication; GPRS communication; WAP communication; cellular ground communication; satellite communication; fibre optic communication and cable communication.

18. A system, according to claim 3, wherein said mobile telephonic communication comprises at least one of: GSM communication; GPRS communication; WAP communication; cellular ground communication; satellite communication; fibre optic communication and cable communication.

19. A system, according to any one of the preceding claims, wherein said monitor comprises one or more manually operable buttons, operative to trigger and to cancel at least one of: a display status report; an amber alert response; a red alert response; a chain red alert response; sending commands from said monitor; receiving commands in said monitor; a low battery alert.

20. A system, according to claim 19, comprising a third server, operative in an amber alert response to make forensic recordings and to allow witnesses to experience events.

21. A system, according to claim 20, wherein said monitor is operative to send and receive cellular telephone short message service (SMS) messages.

22. A monitor, operative to monitor at least one perceivable aspect of a user's environment and to convey signals representative of said at least one perceivable aspect by mobile telephonic communication to a first server and to receive a call from a second server; said monitor placing a first call for a predetermined time to said first server; said first server alerting said second server that said first server has received said first call; said monitor abandoning said first call to said first server after said predetermined time, and said monitor only remaining in communication with said second server when said call from said second server has been successfully received by said monitor.

23. A monitor, according to claim 22, for use when at least one of said first server and said second server is operative automatically to record said at least one perceivable aspect of a user's environment.

24. A monitor, according to claim 22, wherein said at least one perceivable aspect of the user's environment comprises at least one of: sound; images as a succession of periodical still images; images in video form; and the position of the user derived from a Global Positioning by Satellite (OPS) receiver.

25. A method for monitoring at least one perceivable aspect of a user's environment, said method comprising the steps of: providing a monitor, a first server, and a second server; the monitor placing a first call for a predetermined time to the first server; said first server alerting said second server that said first server has received said call from said monitor; said second server placing a call to said monitor; said monitor abandoning said first call to said first server after said predetermined time; and said monitor only remaining in communication with said second server when said call from said second server has been successfully received by said monitor.

26. A method, according to claim 25, including the step of employing at least one of said first server and said second server automatically to record said at least one perceivable aspect of a user's environment.

27. A method, according to claim 26 wherein said at least one perceivable aspect of a user's environment comprises at least one of: sound; images as a succession of periodical still images; images in video form; and a position of the user derived from a Global Positioning by Satellite (GPS) receiver.

* * * * *